US012779527B2

(12) United States Patent
Kölm

(10) Patent No.: US 12,779,527 B2
(45) Date of Patent: Nov. 3, 2026

(54) RIVETING DEVICE WITH A COMPACT DESIGN

(71) Applicant: SFS Group Germany GmbH, Oberursel (DE)

(72) Inventor: Robert Kölm, Neu-Anspach (DE)

(73) Assignee: SFS Group Germany GmbH, Oberursel (DE)

( * ) Notice: Subject to any disclaimer, the term of this patent is extended or adjusted under 35 U.S.C. 154(b) by 118 days.

(21) Appl. No.: 18/871,930

(22) PCT Filed: Jun. 29, 2023

(86) PCT No.: PCT/DE2023/100494
§ 371 (c)(1),
(2) Date: Dec. 5, 2024

(87) PCT Pub. No.: WO2024/002428
PCT Pub. Date: Jan. 4, 2024

(65) Prior Publication Data

US 2025/0339895 A1 Nov. 6, 2025

(30) Foreign Application Priority Data

Jun. 30, 2022 (DE) ..................... 10 2022 116 431.4

(51) Int. Cl.
*B21J 15/10* (2006.01)
*B21J 15/04* (2006.01)
(Continued)

(52) U.S. Cl.
CPC ........... *B21J 15/105* (2013.01); *B21J 15/043* (2013.01); *B21J 15/20* (2013.01); *B21J 15/26* (2013.01);
(Continued)

(58) Field of Classification Search
CPC ........ B21J 15/105; B21J 15/043; B21J 15/26; B21J 15/20; B21J 15/022
See application file for complete search history.

(56) References Cited

U.S. PATENT DOCUMENTS 2,789,619 A 4/1957 Wing et al.
3,410,128 A 11/1968 Suater et al.
(Continued)

FOREIGN PATENT DOCUMENTS

CN 201431990 Y 3/2010
CN 104999410 A 10/2015
(Continued)

*Primary Examiner* — Atul P. Khare
(74) *Attorney, Agent, or Firm* — Smartpat PLC

(57) ABSTRACT

A riveting device has a device housing, a riveting tool and a drive for actuating the riveting tool. The riveting tool has a mouthpiece and a mandrel holder that can be moved relative to the mouthpiece along an operative axis. The drive has a spindle gear with a threaded spindle, and a spindle nut operatively connected thereto. The threaded spindle is operatively connected to the mandrel holder for movement along the operative axis. A support structure provides axial support of the spindle nut. A tool housing is axially supported on the mouthpiece and axially supported on the support structure via a flange. The mandrel holder is received axially moveably in the tool housing. A supporting structure supports the tool housing. The tool housing is held on the supporting structure by a retaining structure. The retaining structure and the supporting structure are connected to each other via a bayonet lock.

24 Claims, 8 Drawing Sheets

(51) Int. Cl.

| | |
|---|---|
| ***B21J 15/20*** | (2006.01) |
| ***B21J 15/26*** | (2006.01) |
| ***B21J 15/32*** | (2006.01) |
| ***B25B 27/00*** | (2006.01) |
| ***B25F 5/00*** | (2006.01) |
| ***B25F 5/02*** | (2006.01) |

(52) U.S. Cl.

CPC ......... *B21J 15/326* (2013.01); *B25B 27/0014* (2013.01); *B25F 5/001* (2013.01); *B25F 5/02* (2013.01)

(56) References Cited

U.S. PATENT DOCUMENTS

| | | | |
|---|---|---|---|
| 3,605,478 | A | 9/1971 | Chirco |
| 4,541,266 | A | 9/1985 | Totsu |
| 4,612,793 | A | 9/1986 | Klein |
| 5,473,805 | A | 12/1995 | Wille |
| 5,511,298 | A | 4/1996 | Gasser |
| 5,598,619 | A | 2/1997 | Rosier |
| 5,605,070 | A | 2/1997 | Wille |
| 6,425,170 | B1 | 7/2002 | Zirps et al. |
| 7,032,281 | B1 | 4/2006 | Lin |
| 11,577,302 | B2 * | 2/2023 | Cumersdale ............. B21J 15/34 |
| D1,021,594 | S | 4/2024 | Schönberner |
| 12,453,999 | B2 * | 10/2025 | Johnson ................... B21J 15/26 |
| 12,539,536 | B2 * | 2/2026 | Bardaré ................. B21J 15/043 |
| 2001/0020322 | A1 | 9/2001 | Wille |
| 2004/0112178 | A1 | 6/2004 | Gilbert et al. |
| 2015/0336159 | A1 | 11/2015 | Gaertner et al. |
| 2019/0283111 | A1 | 9/2019 | Kawai et al. |
| 2020/0130047 | A1 | 4/2020 | Yabunaka et al. |
| 2020/0139424 | A1 | 5/2020 | Yabuguchi et al. |
| 2021/0069773 | A1 | 3/2021 | Yabunaka et al. |
| 2021/0245236 | A1 | 8/2021 | Ko |
| 2021/0379646 | A1 | 12/2021 | Killen |
| 2021/0394253 | A1 | 12/2021 | Yabunaka et al. |
| 2022/0134412 | A1 | 5/2022 | Teng et al. |
| 2022/0355362 | A1 | 11/2022 | Izutsu et al. |

FOREIGN PATENT DOCUMENTS

| | | | |
|---|---|---|---|
| DE | 10011305 | A1 | 9/2001 |
| DE | 60212091 | T2 | 12/2006 |
| DE | 60214540 | T2 | 9/2007 |
| DE | 102016224555 | A1 | 6/2018 |
| DE | 102017215097 | A1 | 2/2019 |
| DE | 102020122949 | A1 | 3/2021 |
| DE | 102022110864 | A1 | 11/2022 |
| DE | 102022116406 | A1 | 1/2024 |
| DE | 102022116431 | A1 | 1/2024 |
| EP | 0116954 | A2 | 8/1984 |
| EP | 0527414 | A1 | 2/1993 |
| EP | 0593720 | A1 | 4/1994 |
| EP | 0670199 | A1 | 9/1995 |
| EP | 1132160 | A1 | 9/2001 |
| EP | 1525928 | A2 | 4/2005 |
| EP | 2910321 | A1 | 8/2015 |
| EP | 3643425 | A1 | 4/2020 |
| EP | 3957441 | A1 | 2/2022 |
| JP | S6127537 | A | 2/1986 |
| WO | 02098585 | A2 | 12/2002 |
| WO | 2015049738 | A1 | 4/2015 |
| WO | 2024002425 | A1 | 1/2024 |
| WO | 2024002426 | A1 | 1/2024 |
| WO | 2024002427 | A1 | 1/2024 |
| WO | 2024002429 | A1 | 1/2024 |
| WO | 2024002430 | A1 | 1/2024 |

* cited by examiner

RIVETING DEVICE WITH A COMPACT DESIGN

CROSS-REFERENCE TO RELATED APPLICATION

This application is a national stage application, filed under 35 U.S.C. § 371, of International Patent Application PCT/DE2023/100494, filed on Jun. 29, 2023, which claims the benefit of German Patent Application DE 10 2022 116 431.4, filed on Jun. 30, 2022.

TECHNICAL FIELD

The present disclosure refers to a riveting device and in particular a blind rivet setting tool, a blind rivet nut setting tool and a blind rivet screw setting tool.

BACKGROUND

Riveting devices are typically used to produce a rivet connection between two or more materials, such as for example metal sheets, at a connection point at which the materials are placed on each other. To form the rivet connection, a plastically deformable, often cylindrical connecting element is used which is generally referred to as a rivet. The rivet usually has a rivet head prefabricated on one end. To produce the rivet connection, the rivet is introduced into a connection hole at the connection point up to the rivet head and then the other end of the rivet is plastically deformed to form a closing head.

Riveting devices can also be used to provide components with a thin wall with a thread. Rivet nuts or rivet screws are used for this, with which a rivet is combined with an element comprising a thread. The rivet nuts or rivet screws are introduced into a prefabricated rivet hole of the component and subsequently a region of the rivet is plastically deformed to form a closing head.

Commonly used riveting devices usually comprise a riveting tool which is set up to cause a plastic deformation forming the closing head. The riveting devices have a drive device accommodated in a device housing for actuating the riveting tool. Often, the drive device is electromechanical and comprises, for example, an electric motor and a spindle gear formed as a ball screw drive having a threaded spindle and a spindle nut. Typically, the spindle nut is driven by the electric motor and the threaded spindle is secured by torque arms against rotation, so that the threaded spindle shifts axially and in the process acts on the riveting tool when the spindle nut rotates.

Such a riveting device is described in EP 0 527 414 A1. The riveting device is formed and set up for blind riveting, by exerting a pulling movement to pull a rivet mandrel out from the rivet body of a blind rivet, compressing the rivet body to create a closing head. The pulling movement is performed by a mandrel holder driven by the drive device via the threaded spindle, on which the rivet mandrel is fixed. The mandrel holder is received in a tool housing and therein is moveably held against a mouthpiece fixed on the tool housing for performing the pulling movement. The rivet mandrel is inserted into the tool housing up to the mandrel holder via the mouthpiece and therefore the riveting device is placed on the point to be riveted.

In the case of the riveting tool, the mouthpiece is mounted via the tool housing on one axial bearing formed as a thrust bearing, which is in turn is supported on the spindle nut of the drive device. The tool housing is thus held on a bearing cup receiving the axial bearing by being screwed on. This type of retaining fixture is however relatively bulky in the movement direction of the mandrel holder and hinders the use of the riveting device.

SUMMARY

In the course of continuous further development, there may therefore be a need to improve the compactness of a riveting device. This is based on the expectation that improved compactness will make it easier to reach hard-to-reach riveting points in order to be able to set a rivet there. It is also expected that improved compactness will make the riveting device easier to handle.

An embodiment of a basic riveting device comprises a device housing, a riveting tool and a drive device in the device housing for actuating the riveting tool. For example, the riveting device, in particular the riveting tool is suitable for blind riveting. The term “blind riveting” is understood to mean in particular that the riveting process is carried out from one side of the material to be provided with a blind rivet using a rivet mandrel. A blind rivet nut or a blind rivet screw can also be used instead of a blind rivet.

Preferably, the riveting tool has a mouthpiece and a mandrel holder that can be moved relative to the mouthpiece along or in the direction of an operative axis. For example, the mandrel holder comprises a chuck housing that can be moved relative to the mouthpiece along or in the direction of the operative axis and at least one clamping element, in particular clamping jaw, that can be moved in the chuck housing along a clamping path.

The drive device can have a spindle gear, in particular a ball screw drive, having a threaded spindle and a spindle nut operatively connected thereto. In particular, the threaded spindle has a feed thread. In particular, the threaded spindle is operatively connected to the spindle nut via the feed thread. In particular, the threaded spindle is operatively connected to the mandrel holder and in particular is set up to be moved along the operative axis, in particular to drive the mandrel holder. In particular, the spindle nut is rotatably mounted. In particular, the spindle nut is or can be driven by an electric motor, for example.

Preferably, the basic riveting device has a support structure for axial support of the spindle nut or for supporting the spindle nut in the direction of the operative axis. For example, the spindle nut is directly or indirectly supported, for example via an axial bearing, on the support structure. The support structure can be a component separate to the axial bearing or be formed thereon. Alternatively, the support structure can be formed on a component of the axial bearing, such as a bearing ring, for example, in particular moulded thereon, or formed thereby. Preferably, the support structure and/or the axial bearing is arranged on the side of the spindle nut facing towards the riveting tool.

Alternatively, the drive device can have a preferably pneumatically and/or hydraulically driven cylinder piston unit having a cylinder and a reciprocating piston received translationally moveably therein. In particular, the reciprocating piston is operatively connected to the mandrel holder and in particular is set up to be moved along the operative axis, in particular to drive the mandrel holder.

In the present disclosure, the term “cylinder” is understood in particular to mean a housing for the reciprocating piston, which can also be referred to as a piston housing. For example, the housing or piston housing has a hollow space, in which the reciprocating piston is received translationally moveably in the direction of its piston axis. The housing or piston housing can be a tubular-shaped housing.

In the case of this alternative drive device, if necessary, a support structure is provided for axial support of the cylinder or for supporting the cylinder in the direction of the operative axis. For example, the cylinder is directly or indirectly supported on the support structure. Preferably, the support structure is arranged on the side of the cylinder facing towards the riveting tool. Such a support structure can also be omitted, however, i.e. the basic riveting device is present without such a support structure.

Preferably, the basic riveting device also has a tool housing in which the mandrel holder is received axially moveably in relation to the operative axis. In particular, on the one hand, the tool housing is supported on the mouthpiece and, on the other hand, for example, it is supported on the support structure via a flange. This is preferably the case when the drive device has the above-described spindle gear.

On the one hand, the tool housing can also be supported on the mouthpiece and, on the other hand, it can be supported axially on the optionally provided support structure and/or the cylinder, for example via a flange. This is preferably the case when the drive device is provided with the above-described cylinder piston unit. For example, the tool housing and the mouthpiece are separate components. For example, the mouthpiece is fixed on the tool housing. Alternatively, the mouthpiece can be moulded onto the tool housing.

Preferably, the basic riveting device also has a supporting structure for supporting the tool housing. Preferably, the basic riveting device also has a retaining structure, via which the tool housing is held on the supporting structure, in particular is releasably held. For example, the retaining structure is separate to the tool housing, i.e. the retaining structure and the tool housing are separate components.

An improvement in compactness is offered by an embodiment of the riveting device in which the retaining structure and the supporting structure are connected to each other via a bayonet lock. It has been shown that the riveting device can be built shorter axially in relation to the operative axis with the bayonet lock than for example with attachment via a screw connection. The bayonet lock further enables a faster exchange of the tool housing in comparison to a screw connection. The bayonet lock also enables simpler handling in comparison to a screw connection.

In the present disclosure, the term “bayonet lock” is understood to mean any type of mechanical connection of two connecting parts, which is created by interlocking in the direction of a plug-in axis and subsequent rotation of the connecting parts relative to each other around the plug-in axis. A plug-in rotary movement of the connecting parts relative to each other is performed to produce the mechanical connection. Preferably, the connecting parts are brought into an interlocking position by the rotary movement, in which they are blocked against being pulled apart along the plug-in axis, preferably in a form-fitting manner.

In one embodiment, the bayonet lock comprises a bayonet connection which is assigned to the retaining structure, in particular is arranged or formed on the retaining structure. Furthermore, the retaining structure comprises a through-opening in a wall surface. The tool housing is received in the through-opening, for example received with the radial clearance, and in particular the wall surface serves as an axial limitation for the flange of the tool housing, for example in the region around the through-opening. For example, the retaining structure is a union element, in particular a union ring.

In this embodiment, the improved riveting device can be designed so that the bayonet connection is provided at a radial distance from the through-opening. For example, the bayonet connection is provided at a radial distance from and concentric to the through-opening. The bayonet connection is located radially outside of the tool housing owing to such a radial arrangement of the bayonet connection relative to the through-opening. Therefore, a further measure is taken which favours a compact embodiment of the riveting device in the axial direction in relation to the operative axis. In this vein, the embodiment aims for the bayonet connection to also have a ring structure, the inner circumference of which surrounds the through-opening and in particular the tool housing at a radial distance.

In a further embodiment, the bayonet connection comprises a plug-in receptacle and the plug-in receptacle has a circumferential surface which is circumferential at a radial distance around the through-opening. In this case, the improved riveting device can be designed so that at least two radially inwardly protruding ring segments are provided on the circumferential surface, which are arranged distributed over the circumference of the plug-in receptacle and serve to lock the bayonet lock. Therefore, a further measure is taken which favours a compact embodiment of the riveting device in the axial direction in relation to the operative axis. In particular, the at least two ring segments form gaps between each other, via which the plug-in receptacle is accessible in an axial direction.

For example, the plug-in receptacle has a base surface. To optimise the axial compactness, it can be provided that the base surface coincides with the wall surface having the through-opening and/or the base surface and the wall surface are in a common plane or at least axially near to each other.

The improved riveting device can be designed so that the plug-in receptacle is formed by a ring-shaped and/or round recess in the retaining structure. This avoids the need for a separate component for providing the plug-in receptacle and the installation space to be provided for it can be reduced. Preferably, the base of the recess is dimensioned such that the plug-in depth of the plug-in receptacle is limited.

In a further embodiment, the bayonet lock comprises a bayonet connection which is assigned to the supporting structure, in particular is arranged or formed on the supporting structure. In this case, the improved riveting device can be designed so that the supporting structure has a ring-shaped extension, on the outer circumference of which at least two radially outwardly protruding ring segments are provided, which are arranged distributed over the outer circumference and serve to lock the bayonet lock. Installation space can also be reduced in an axial direction relative to the operative axis with this radial arrangement.

In particular, the extension is formed or can be used as a plug-in part to be plugged into the above-described plug-in receptacle. In particular, the at least two ring segments of the extension form gaps between each other which are dimensioned such that the at least two ring segments on the plug-in receptacle fit in the gaps when plugging the extension into the plug-in receptacle. Preferably, in the same manner, the gaps between the at least two ring segments on the plug-in receptacle are dimensioned so that the at least two ring segments of the extension fit into the gaps between the at least two ring segments of the plug-in receptacle when plugging the extension into the plug-in receptacle.

In particular, the supporting structure is arranged on the support structure or is formed by the support structure, in particular moulded thereon. Therefore, the ring segments can be designed to be thinner in an axial direction in relation to the operative axis, in particular when the support structure consists or has a load stable material, such as metal, for example. In this respect, axial installation space can be reduced in this manner.

In particular, a flange surface cooperating with the flange of the tool housing is formed on the inner circumference of the ring-shaped extension. For example, the supporting structure and the support structure are formed on a common component. In this embodiment, it is preferably provided that the supporting structure and the device housing are separate components.

In another embodiment, the bayonet lock comprises a bayonet connection which is assigned to the device housing, in particular is arranged or formed on the device housing. By assigning the bayonet connection to the device housing, manufacturing costs can be saved, in particular when the device housing consists of or has a plastic material.

In this case, the improved riveting device can be designed so that the device housing has a ring-shaped extension, on the outer circumference of which at least two radially outwardly protruding ring segments are provided, which are arranged distributed over the outer circumference and serve to lock the bayonet lock. For example, it can be provided that the inner circumference of the ring-shaped extension surrounds the supporting structure and/or the support structure and/or the tool housing and/or the flange with a radial distance or at least with radial clearance.

Alternatively, it can be provided that a flange surface cooperating with the flange of the tool housing is formed on an end face of the ring-shaped extension. This embodiment is suitable if the riveting device has the above-described cylinder piston unit. In this case, the supporting structure can be arranged on the cylinder or can be formed by the cylinder.

A further embodiment is that the device housing has one at least partially tube-shaped contour. In particular, the retaining structure is arranged on an end face of the tube-shaped contour facing towards the mouthpiece. For example, the tube-shaped contour preferably extends with its tube axis coaxial to the operative axis.

The improved riveting device can be designed in this embodiment so that the retaining structure is circumferential in relation to the operative axis around the outer circumference and in particular covers an end face of the tube-shaped contour and/or closes the interior of the tube-shaped contour of the device housing at an end face. Therefore, the retaining structure has an additional cover or covering function. In order to enable an aesthetic appearance, the outer circumferential contour of the retaining structure is to be adapted to the tube-shaped contour of the device housing in the region of the facing end face.

The improved riveting device can also be designed so that at least one light source is provided in the device housing and that the retaining structure is formed at least in one region as a light guide or has a light guide in order, by means of this, to transmit light rays of the light source in the direction of the mouthpiece. Therefore, the light source is housed in a protected manner and maintains its function at the same time, specifically to illuminate the working region of the riveting device. The working region comprises the region around the front end of the tool housing, i.e. where the rivet is set.

For example, the light guide is connected downstream of the bayonet lock and/or the support structure when viewed radially outwards. This favours light emission from the device housing, since the bayonet lock or the support structure can eliminate the need for an opening for the passage of light.

The light guide of the retaining structure can be an optical lens and/or a perform a lens function, for example combine or scatter light rays of the light source. Therefore, a desired illumination over a desired region is realised in a simple manner. For example, the light source is an LED. In the present disclosure, the term “LED” is understood to mean both an individual LED as well as an LED unit having several LEDs, such as a COB-LED, wherein the LED can be mounted or premounted on a carrier board. This can also be understood to mean an LED chip.

In order to have the retaining structure in a desired rotational position relative to the support structure in a final position or closed position of the bayonet lock, an abutment is provided. The abutment can comprise or be formed from a material section or shaping on the retaining structure and/or support structure. Preferably, the region formed as a light guide or the region of the retaining structure provided with the light guide is arranged so that the light guide is at a predetermined point in the final position or the closed position of the bayonet lock, in order to achieve the desired light transmission.

For example, the support structure is ring-shaped and has a circumferential collar on its outer circumference, which collar engages into a receptacle of the device housing having an axial and/or radial clearance. Therefore, it is avoided or at least counteracted that a drive force exerted by the threaded spindle on the mandrel holder or a setting force acts in the device housing via the support structure. The device housing can thus be designed with regard to a lower component load, whereby costs and/or weight can be reduced.

For example, an improved riveting device can be designed so that the support structure is circular and has a groove or another elongate recess on the circumference, the longitudinal extension of which extends along the operative axis, wherein a material section or spring section of the device housing engages into the groove or recess in order to secure against rotation. Therefore, a simple and/or cost-effective production is favoured.

In a further embodiment, the riveting device is formed as a hand riveting device and comprises a handle part, which for example has a longitudinal extension transverse to the operative axis. For example, the handle part is formed on the device housing, in particular moulded or fixed thereon. The riveting device can be held in the hand or manually guided by the handle part. In particular, the handle part allows the riveting device to be positioned manually at a point to be riveted.

According to one aspect, a blind rivet setting tool is proposed. The blind rivet setting tool comprises the above-described riveting device and has a rivet mandrel received in its mandrel holder of a blind rivet to be set.

According to a further aspect, a blind rivet nut setting tool is proposed. The blind rivet nut setting tool comprises the above-described riveting device and has a threaded rivet mandrel received in its mandrel holder for a blind rivet nut to be set.

According to a further aspect, a blind rivet screw setting tool is proposed. The blind rivet screw setting tool comprises the above-described riveting device and has a threaded rivet mandrel received in its mandrel holder of a blind rivet screw to be set.

Further characteristics and features result from the following description of several exemplary embodiments with reference to the drawings.

DETAILED DESCRIPTION

Figure 1:
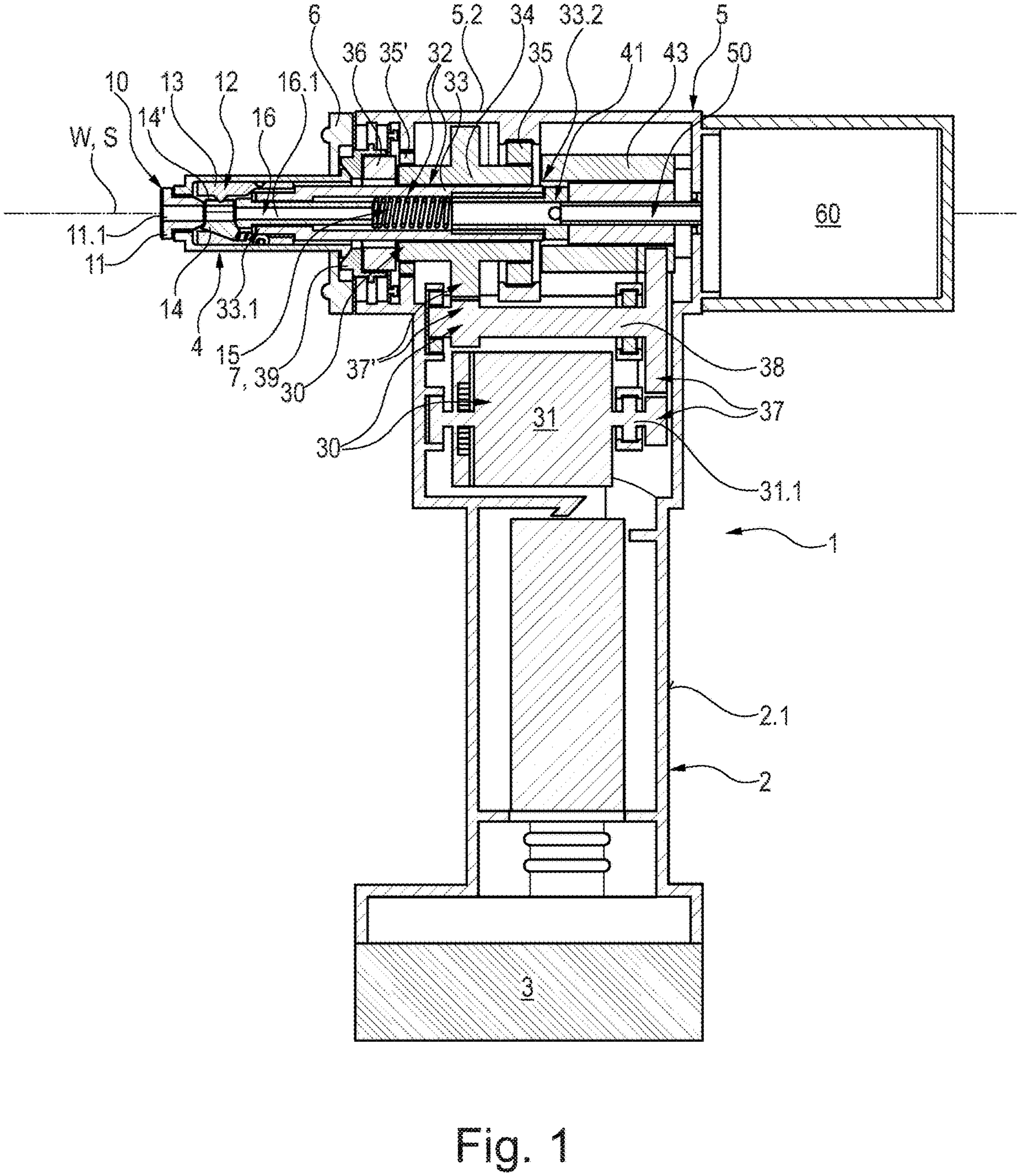
FIG. 1 shows a first exemplary embodiment of a riveting device having a riveting tool and a drive device for actuating the riveting tool in a schematic sectional representation.

FIG. 1 shows the construction of an exemplary embodiment of a riveting device 1 which is also referred to as a setting device by experts. The exemplary riveting device 1 is suitable for applying or setting rivets according to the blind riveting method, and in this regard is designed for using blind rivets.

The exemplary riveting device 1 comprises a riveting tool 10 and a drive device 30 for actuating the riveting tool 10. Preferably, the riveting tool 10 is assigned to a tool housing 4. Preferably, the drive device 30 is assigned to a device housing 5, in particular received therein. Preferably, the tool housing 4 is a metal housing. Preferably, the device housing 5 is a plastic housing.

The exemplary riveting device 1 can be a hand riveting device. The hand riveting device 1 has a gripping surface 2.1 which can be formed at least partially on the device housing 5. For example, the hand riveting device 1 has a handle part 2 which is at least partially formed by the device housing 5. The riveting device 1 can be held in the hand by the gripping surface 2.1 or the handle part 2 when it is used for setting a rivet, in particular a blind rivet, on a workpiece. The riveting process as such then takes place by actuating the riveting tool 10 via the drive device 30.

Preferably, the drive device 30 is an electromechanical drive device. The electromechanical drive device 30 comprises, for example, an electric motor 31 having a rotatable output shaft 31.1 and preferably a spindle gear 32, which can be driven by the electric motor 31. Preferably, the spindle gear 32 is set up to convert a rotational drive movement coming from the output shaft 31.1 into a translational drive movement which acts along an operative axis W to actuate the riveting tool 10. The spindle gear 32 can be a ball screw drive.

In the exemplary riveting device 1, for example at least one, preferably two reduction stages 37, 37' can be interposed between the electric motor 31 and the spindle gear 32. For example, the reduction stages 37, 37' are connected in series in the force flow. For example, the reduction stages 37, 37' use a common intermediate shaft 38. For example, at least one of the reduction stages 37, 37' is a spur gear stage and the associated gear elements are spur gearwheels.

A preferably replaceable electrical energy storage device, such as an accumulator 3, can be provided for the electrical energy supply of the drive device 30, which energy storage device is arranged, for example, in the region of an end of the handle part 2 facing away from the riveting tool 10. Therefore, the riveting device 1 can be a cordless tool.

The riveting tool 10 can comprise a mouthpiece 11 and a mandrel holder 12 that can be moved relative to the mouthpiece 11 in the direction of the operative axis W. For example, the mandrel holder 12 has a chuck housing 13 and at least one, preferably several clamping elements 14, 14', in particular clamping jaws, which can be moved in the chuck housing 13 along a clamping path. Preferably, the mouthpiece 11 and/or the mandrel holder 12 and/or the chuck housing 13 and/or the clamping elements 14, 14' are a metal part.

The mouthpiece 11 serves, for example, to receive a rivet (not shown in FIG. 1) to be set, in particular a blind rivet, and preferably has a through hole 11.1, in order to insert the rivet mandrel of the rivet therein. The mandrel holder 12 serves, for example, to fix the rivet mandrel, so that a non-displaceable connection between the received rivet mandrel and the mandrel holder 12 is created. This can take place, for example, via the chuck housing 13 with the clamping elements 14, 14' arranged moveably therein, by means of which the rivet mandrel is fixed in the chuck housing 13, in particular is clamped therein.

The riveting tool 10 can be actuated by the drive device 30 so that the mandrel holder 12 or the chuck housing 13 is moved away from the mouthpiece 11 with the rivet mandrel, fixed thereinto, in the direction of the operative axis W. This happens, for example, by the drive device 30 pulling the mandrel holder 12 or the chuck housing 13 away from the mouthpiece 11. This mode of operation, which is known per se, and the blind riveting which can be carried out with it is described in more detail in the publication EP 0 116 954 A2, to which reference is hereby made for the purpose of completing and supplementing the present disclosure, with the note that the publication may attach a meaning to identically worded terms which differs from the present meaning.

Preferably, the mouthpiece 11 is fixed to the tool housing 4, for example screwed to it. Preferably, the mandrel holder 12, in particular the chuck housing 13, is received in the tool housing 4 so as to be moveable in the direction of the operative axis W. For example, the tool housing 4 has a longitudinal, in particular tube-shaped base body. In this respect, the tool housing 4 is also referred to as a setting sleeve by experts. For example, the mouthpiece 11 is fixed on one end of the tool housing 4 and the opposing end faces towards the device housing 5.

Preferably, the spindle gear 32 is arranged in the device housing 5. Preferably, the spindle gear 32 comprises a threaded spindle 33 having a feed thread and a spindle nut 34 that is or can be engaged therewith. Preferably, the threaded spindle 33 has a front end 33.1, facing towards the mandrel holder 12, in particular the chuck housing 13, and an opposing back end 33.2. Preferably, the threaded spindle 33 and the spindle nut 34 are arranged concentrically to each other with regard to a transmission axis. Preferably, the spindle axis S of the threaded spindle 33 lies on the transmission axis. Preferably, the output shaft 31.1 of the electric motor 31 is arranged axially parallel to the transmission axis. Preferably, the transmission axis or the spindle axis S lies on the operative axis W.

For example, the threaded spindle 33 and the spindle nut 34 are set up in such a way that the spindle nut 34 is the gear element that is or can be driven by the electric motor 31 and the threaded spindle 33 is used for performing the translational drive movement in order to actuate the riveting tool 10. For example, the threaded spindle 33 is non-displaceably connected directly or indirectly to the mandrel holder 12 or the chuck housing 13, at its front end 33.1, for example via an intermediate piece. For example, the spindle nut 34 is also rotatably mounted in the radial direction relative to the transmission axis or the operative axis W via at least one, preferably two radial bearing 35, 35' in the device housing 5.

In the exemplary riveting device 1, a torque arm 41 is provided for example, in order to secure the threaded spindle 33 against rotation relative to the device housing 5. For example, the torque arm 41 is arranged on the threaded spindle 33, in particular fixed thereon or connected thereto in a rotationally fixed manner. For example, the torque arm 41 is supported against a counter bearing 43, preferably via at least one sliding body or rolling body, in order to form the rotation lock for the threaded spindle 33. The counter bearing 43 itself can be arranged rotationally fixed or secured against rotation with respect to the device housing 5. For example, the counter bearing 43 has at least one guide track on which the torque arm 41 is guided while maintaining the rotation protection when the threaded spindle 33 performs a translational movement along the operative axis W.

In the exemplary riveting device 1, a spring element 15 is provided, for example, which acts with a force in the mandrel holder 12, for example via a pressure part 16. For example, the spring element 15 is arranged in the threaded spindle 33. For example, the threaded spindle 33 and/or the torque arm 41 serves as a counter holder for the spring element 15.

The force of the spring element 15 can be used as a pretension force which causes or at least helps the rivet mandrel to be fixed in the mandrel holder 12. For example, the spring element 15 is provided in order to apply a spring force to the clamping elements 14, 14' to force them into the chuck housing 13. As a result, the clamping elements 14, 14' are pushed into a clamping position against a rivet mandrel, for example of a blind rivet, which has been introduced via the through hole 11.1 of the mouthpiece 11 into the chuck housing 13. For example, the spring element 15 is a compression spring.

Preferably, the threaded spindle 33 is formed as a hollow spindle with a through hole 40 extending in the direction of its longitudinal extension. The through hole 40 makes it possible to remove from the riveting tool 10 any rivet mandrel remnants remaining from a riveting process. In this case, for example, the pressure part 16 arranged on the front end 33.1 of the threaded spindle 33 is received in the through hole 40 and itself is formed as a hollow body having a through hole 16.1.

For example, the through hole 40 on the back end 33.2 of the threaded spindle 33 leads into a tubular element 50, which in turn leads into a collection container 60. For example, in this manner, a mandrel removal path is realised via the threaded spindle 33, wherein the collection container 60 can serve as a collector for mandrel remnants. Preferably, the collection container 60 is arranged fixed integral with the housing relative to the device housing 5, in particular arranged releasably, for example fixed on the device housing 5, in particular releasably fixed thereon.

For example, the torque arm 41 is also formed as a hollow body having a through hole which is a component of the mandrel removal path to the collection container 60, for example. For example, the torque arm 41 engages into the through hole 40 of the threaded spindle 33 and the tubular element 50 engages into the through hole of the torque arm 41.

In the exemplary riveting device 1, a support structure 39 is provided, for example, on which on the one hand the tool housing 4 and on the other hand an axial bearing 36, preferably formed as a thrust bearing, are supported axially with respect to the operative axis W, which in turn is supported axially on the spindle nut 34. The mouthpiece 11 is therefore mounted on the axial bearing 36 via the tool housing 4 and the support structure 39, which is in turn supported on the spindle nut 34. In this manner, a load path is formed for the setting force occurring during a riveting process by bypassing or mostly bypassing the device housing 5.

With the riveting device 1, a supporting structure 7 is provided for example, which supports the tool housing 4. A connection between the tool housing 4 and the supporting structure 7 is therefore realised in that the tool housing 4 is held on the supporting structure 7 via a retaining structure 6, preferably releasably held. In order to illustrate this better, in FIG. 2 the exemplary riveting device 1 is shown in the region of the connection of the tool housing 4 on the supporting structure 7 in an enlarged section of FIG. 1. The supporting structure 7 itself is shown in FIG. 3 in a perspective representation.

The supporting structure 7 is formed in a ring shape for example. The support structure 39 can have a circumferential collar 39.3 on its outer circumference, which for example engages into a receptacle 5.3 of the device housing 5 with an axial and/or radial clearance. In particular, as can be seen from FIGS. 2 and 3, the supporting structure 7 can be arranged on the support structure 39, in particular formed thereon, for example moulded thereon.

In particular, it can be provided that the supporting structure 7 and the support structure 39 are formed on a common component. In this respect, the ring-shaped supporting structure 7 or the support structure 39 can have a flange surface 39.2 on its inner circumference, which corresponds to a flange surface 4.2 of a flange 4.1 of the tool housing 4. This is to be able to form the above-described load path. For this purpose, the flange surfaces 39.2, 4.2 can be formed as a circumferential slanted surface. For example, the slanted surface widens radially in the direction of the mouthpiece 11.

The support structure 39 can be formed as a bearing housing on its end face facing towards the axial bearing 36 and for example can have a recess 39.5, in which the axial bearing 36 is at least partially received or pushed. For example, the axial bearing 36 is an axial roller bearing. In principle, the axial bearing 36 can also be a needle bearing.

The support structure 39 can be circular. For example, the support structure 39 has a groove 39.4 on the outer circumference, the longitudinal extension of which extends in the direction of the operative axis W and a spring section of the device housing 5 (not shown in the figures) engages into the groove 39.4, in order to secure against rotation. Preferably, the support structure 39 is designed to be resistant to deformation, in particular bending-resistant. For example, the support structure 39 is a metal part.

Figure 4:
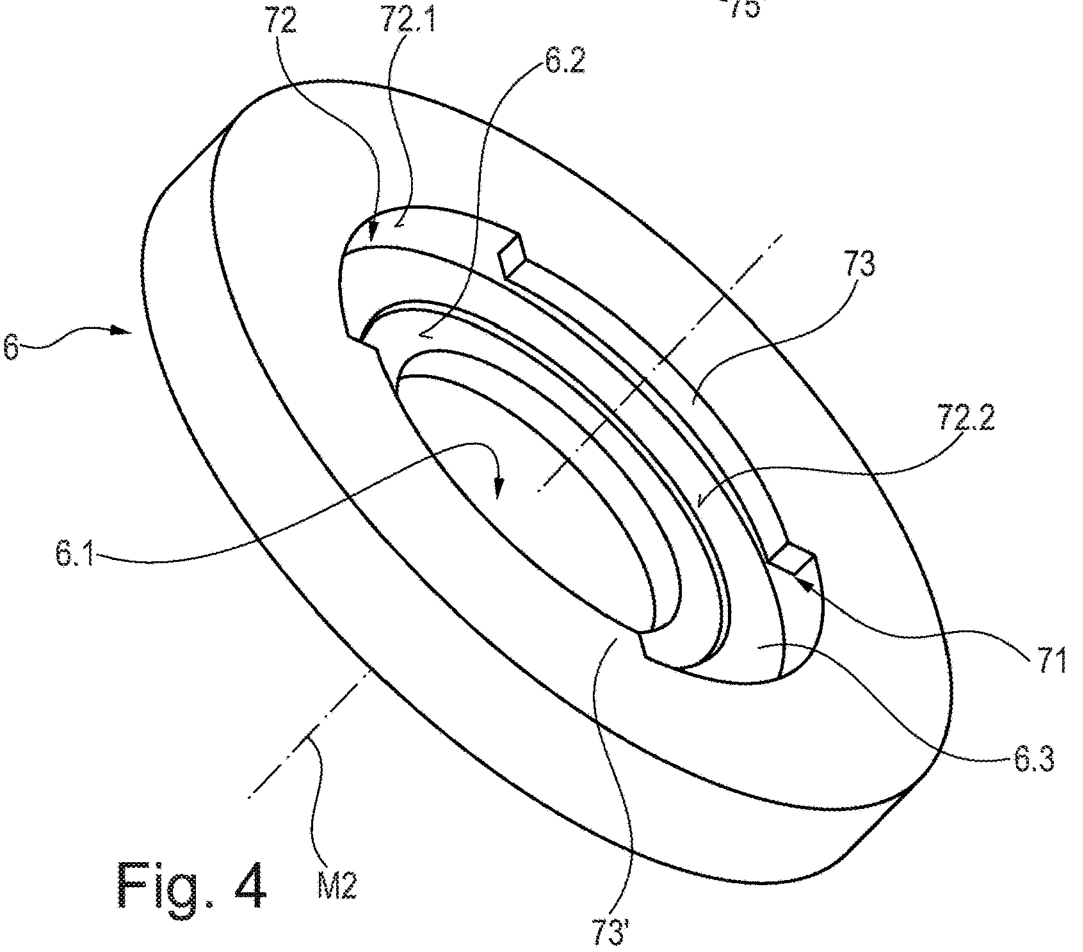
FIG. 4 shows the support structure of the exemplary riveting device of FIG. 1 in a perspective representation.

As already explained above, the tool housing 4 is held on the support structure 39 via the retaining structure 6. FIG. 4 shows the exemplarily used retaining structure 6 in a perspective representation for illustration purposes.

Preferably, the retaining structure 6 is a separate component. For example, the retaining structure 6 has a through-hole 6.1 in a wall surface 6.2. For example, the tool housing 4 is received in the through-hole 6.1 or the retaining structure 6 is inserted into the tool housing 4. In this respect, the retaining structure 6 may be a union element, for example. For example, the wall surface 6.2 serves as an axial limitation for the flange 4.1 of the tool housing 4 in the region around the through-opening 6.1

The radial dimensions of the retaining structure 6 are adapted to the radial dimensions of the device housing 5, for example. For example, the device housing 5 has at least one partially tube-shaped contour 5.2 in the region around the operative axis W. For example, the tube-shaped contour 5.2 is coaxial to the operative axis W. For example, the retaining structure 6 is arranged on an end face 5.4 of the tube-shaped contour 5.2 facing towards the mouthpiece 11. For example, the retaining structure 6 is circumferential around the outer circumference of the tool housing 4 in relation to the operative axis W and the interior space of the tube-shaped contour 5.2 of the device housing 5 is closed at an end face.

With the exemplary riveting device 1, a fixing of the retaining structure 6 is provided by way of example on the supporting structure 7 via a bayonet lock 70. In addition to the proposed construction of the supporting structure 7 or the support structure 39 and the retaining structure 6, a fixing of the tool housing 4 on the supporting structure 7 is favoured in relation to the operative axis W in an axially compact manner with the bayonet lock 70.

For example, the bayonet lock 70 comprises a bayonet connection 71 which is assigned to the retaining structure 6, in particular arranged thereon, for example is formed thereon. For example, the bayonet connection 71 is arranged at a radial distance from the through-opening 6.1. For example, the bayonet connection 71 has a ring structure and the inner circumference of the ring structure surrounds the through-opening 6.1 at a radial distance. For example, the ring structure is concentric to the through-opening 6.1 in relation to the central axis thereof M2.

The bayonet connection 71 comprises. For example, a plug-in receptacle 72 in a ring-shaped recess 6.3 in the retaining structure 6 having a circumferential surface 72.1 and a base surface 72.2. The circumferential surface 72.1 is circumferential at a radial distance around the through-opening 6.1, for example. The bayonet connection 71 also comprises at least two radially inwardly protruding ring segments 73, 73', which are preferably on the circumferential surface 72.1, preferably arranged distributed over the circumference of the plug-in receptacle 72 and serve to lock the bayonet lock 70.

The bayonet lock 70 has a further bayonet connection 74 which is provided on the supporting structure 7. For example, the further bayonet connection 74 is arranged on a ring-shaped extension 39.1 of the supporting structure 7 or support structure 39, in particular formed thereon. For example, the ring-shaped extension 39.1 is smaller in diameter than the outer contour of the support structure 39, so that a circumferential shoulder 39.6 is formed.

For example, the ring-shaped extension 39.1 is formed in order to be plugged into the plug-in receptacle 72 of the retaining structure 6 as a plug-in part for insertion. For example, the flange surface 39.2 cooperating with the flange 4.1 of the tool housing 4 is formed on the inner circumference of the extension 39.1. For example, at least two radially outwardly protruding ring segments 75, 75' are provided on the outer circumference of the extension 39.1, which are arranged distributed over the outer circumference and serve to lock the bayonet lock 70.

Preferably, the at least two ring segments 73, 73' of the bayonet connection 71 form gaps between each other, via which the plug-in receptacle 72 is accessible in an axial direction. Preferably, the at least two ring segments 75, 75' of the ring-shaped extension 39.1 similarly form gaps between each other. Preferably, the gaps are dimensioned such that the at least two ring segments 73, 73' on the plug-in receptacle 72 fit into the gaps between the at least two ring segments 75, 75' of the extension 39.1 when the extension 39.1 is plugged into the plug-in receptacle 72. Preferably, in the same manner, the gaps between the at least two ring segments 73, 73' on the plug-in receptacle 72 are dimensioned so that the at least two ring segments 75, 75' of the extension 39.1 fit into the gaps between the at least two ring segments 73, 73' of the plug-in receptacle 72 when the extension 39.1 is plugged into the plug-in receptacle 72.

Figure 5:
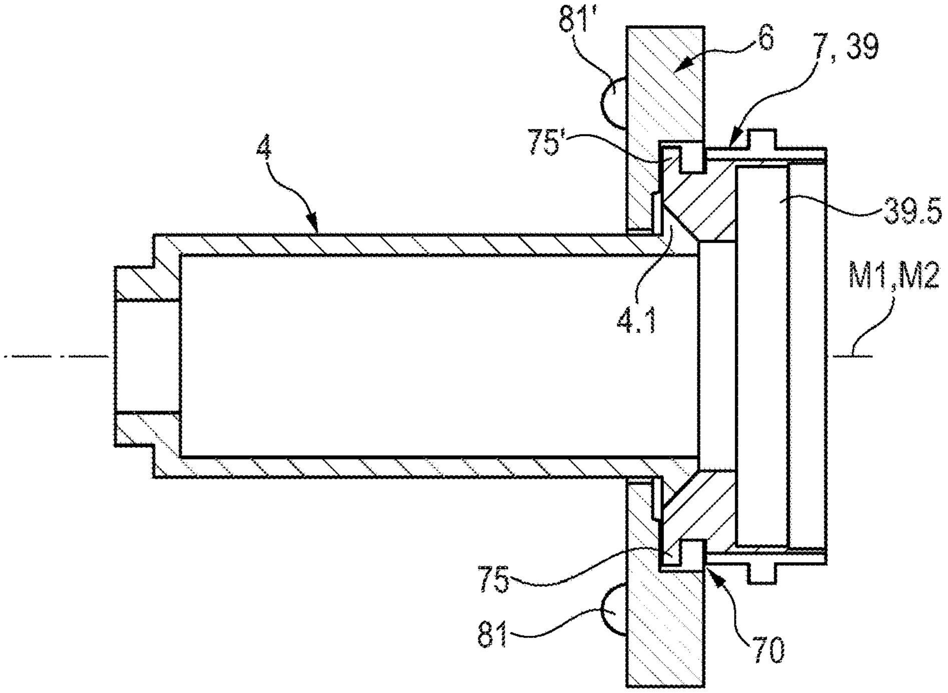
FIG. 5 shows the tool housing, the support structure and the retaining structure of the exemplary riveting device of FIG. 1 in an assembled state as a sectional representation, wherein a bayonet connection of the support structure and a bayonet connection of the retaining structure are plugged into each other and are unlocked.

The bayonet connection 71 and the other bayonet connection 74 enables a mechanical connection or fixing of the retaining structure 6 having the supporting structure 7 by a plug-in rotary movement. In a first step, the plug-in receptacle 72 of the retaining structure 6 is pushed onto the tube-shaped extension 39.1, i.e. the tube-shaped extension 39.1 is plugged into the plug-in receptacle 72. The achieved plugged connection between the retaining structure 6 and the supporting structure 7 while receiving the tool housing 4 is shown simplified in a sectional representation in FIG. 5. In this state, the retaining structure 6 and the supporting structure 7 are releasable from each other in an axial direction. Preferably, the central axis M2 of the through-opening 6.1 of the retaining structure 6 and the central axis M1 of the supporting structure 7 are placed coaxially to each other.

Figure 6:
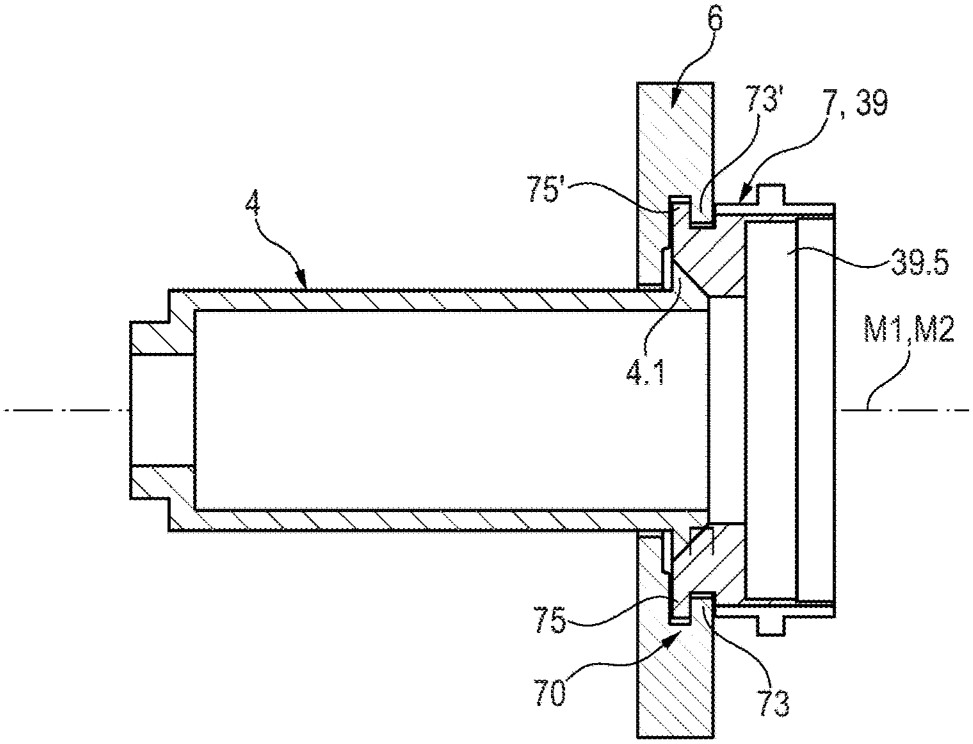
FIG. 6 shows the tool housing, the support structure and the retaining structure of the exemplary riveting device of FIG. 1 in an assembled state as a sectional representation, wherein the bayonet connection of the support structure and the bayonet connection of the retaining structure are plugged into each other and are locked.

In a second step, the retaining structure 6 is rotated relative to the supporting structure 7 around the central axis M1 or M2, thereby causing the ring segments 73, 73' on the retaining structure 6 to engage with the ring segments 75, 75' on the supporting structure 7 and forming a locking of the bayonet lock 70, by which releasing of the retaining structure 6 from the supporting structure 7 is blocked in a form-fitting manner in the axial direction. This state is represented simplified in a sectional representation in FIG. 6.

Preferably, an abutment or a rotary abutment is provided (not shown in the figures), by which the rotational movement of the retaining structure 6 is limited relative to the supporting structure 7 when locking the bayonet lock 70. Therefore, in the locking position of the bayonet lock 70, the retaining structure 6 is brought into a desired rotational position. Over-rotation is prevented by the abutment, so that any release of the locking caused thereby is prevented.

However, a further effect can be used by the abutment. For example, a light source 80, such as for example an LED, is arranged in the device housing 5. A ring having multiple light sources 80, 80', in particular LEDs, arranged distributed over the circumference can also be provided, which extends around the operative axis W. For example, in this case, the retaining structure 6 has one or more light guides 81, 81' in order to thereby transmit light rays of the light source 80 or 80' in the direction of the mouthpiece 11. For example, the light guide 81 or 81' is connected downstream of the bayonet lock 70 or the support structure 39 when viewed radially outwards.

It is ensured with the abutment that, in the locking position of the bayonet lock 70, the light guide 81 or 81' is located in the predetermined position, that a desired radiation of the light rays created by the associated light source 80 or 80' takes place, in particular takes place in the desired direction.

Figure 7:
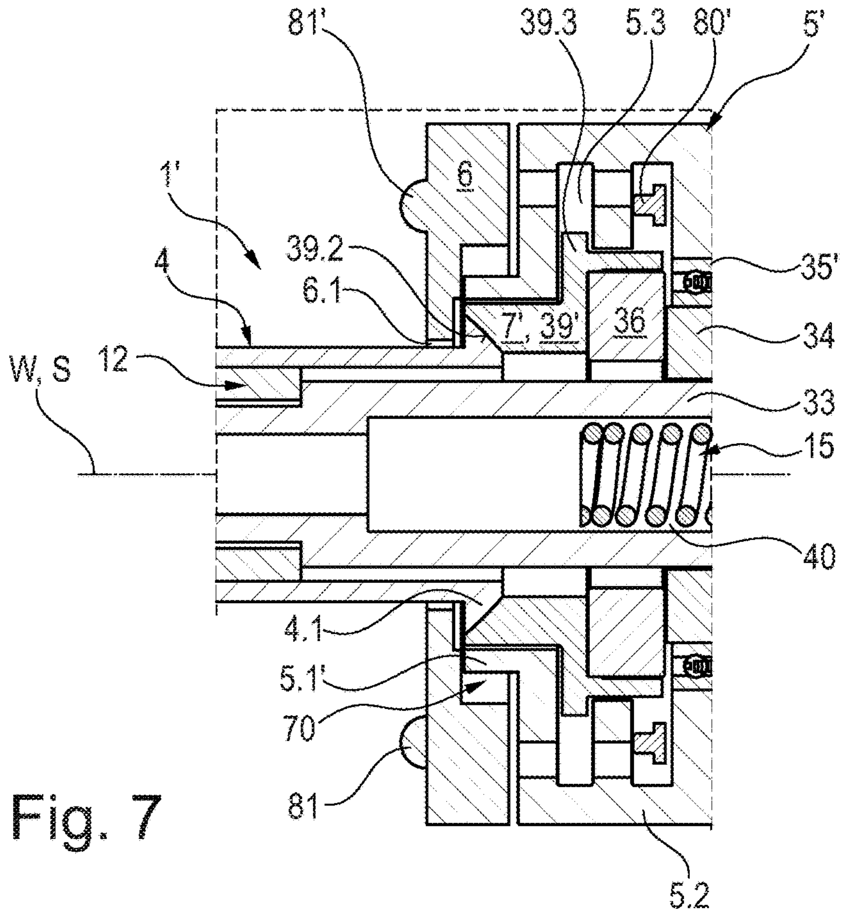
FIG. 7 shows a second exemplary embodiment of a riveting device having a riveting tool and a drive device for actuating the riveting tool in a schematic sectional representation, represented in a section in the region of the connection of a tool housing via a bayonet lock.

FIG. 7 shows by way of example a further embodiment of a riveting device 1'. FIG. 7 shows the other exemplary riveting device 1' by way of example in a section, which is represented in a comparable manner to the riveting device 1 in FIG. 2. Components of the further exemplary riveting device 1' which are structurally or functionally identical to components of the exemplary riveting device 1 of FIGS. 1 to 2 are provided with the same reference numerals; in this respect, reference is made to the description of the exemplary riveting device 1 of FIGS. 1 to 2.

Figure 2:
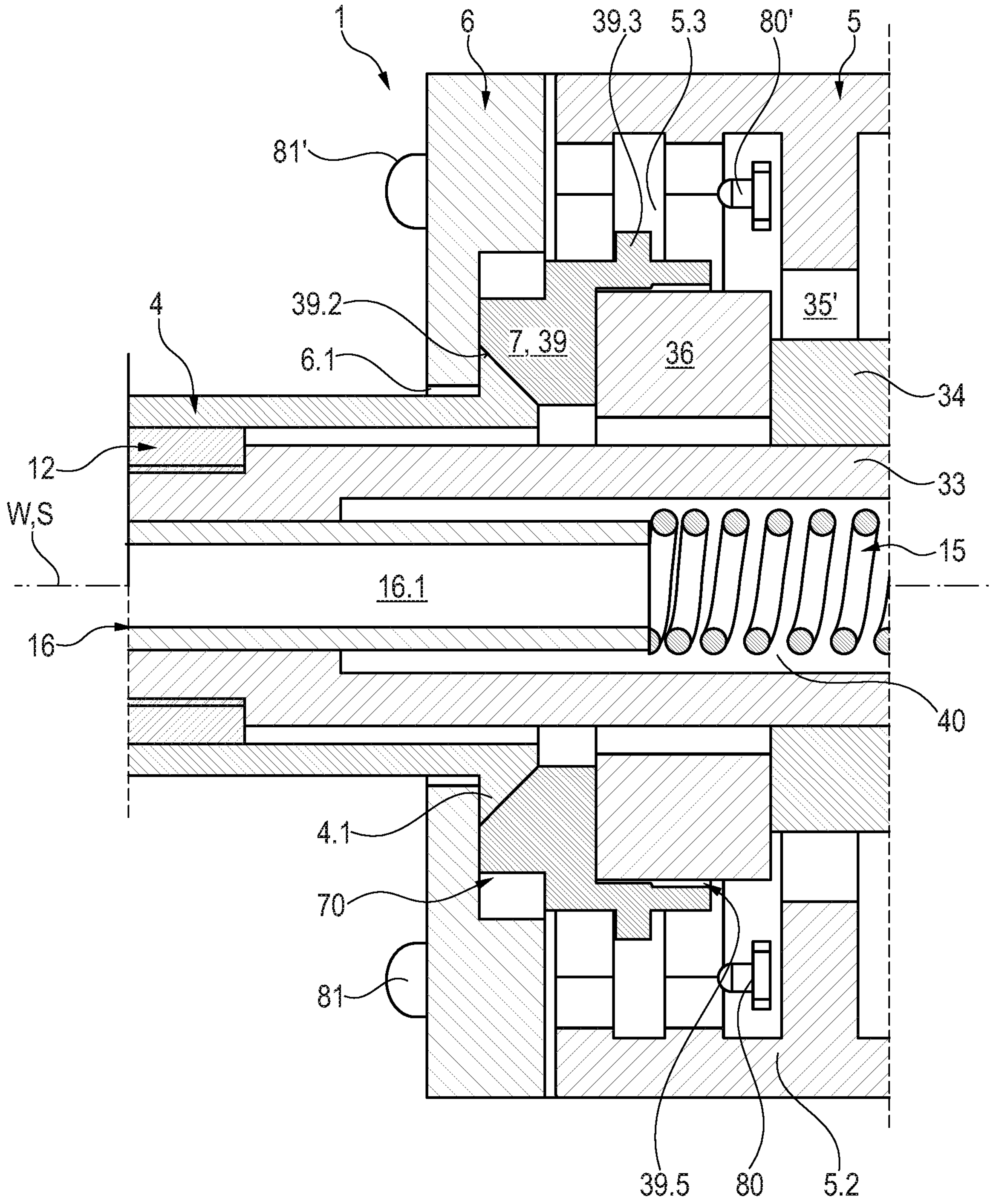
FIG. 2 shows the exemplary riveting device in an enlarged section of FIG. 1 in the region of the connection of a tool housing to a support structure via a retaining structure and a bayonet lock.
Figure 3:
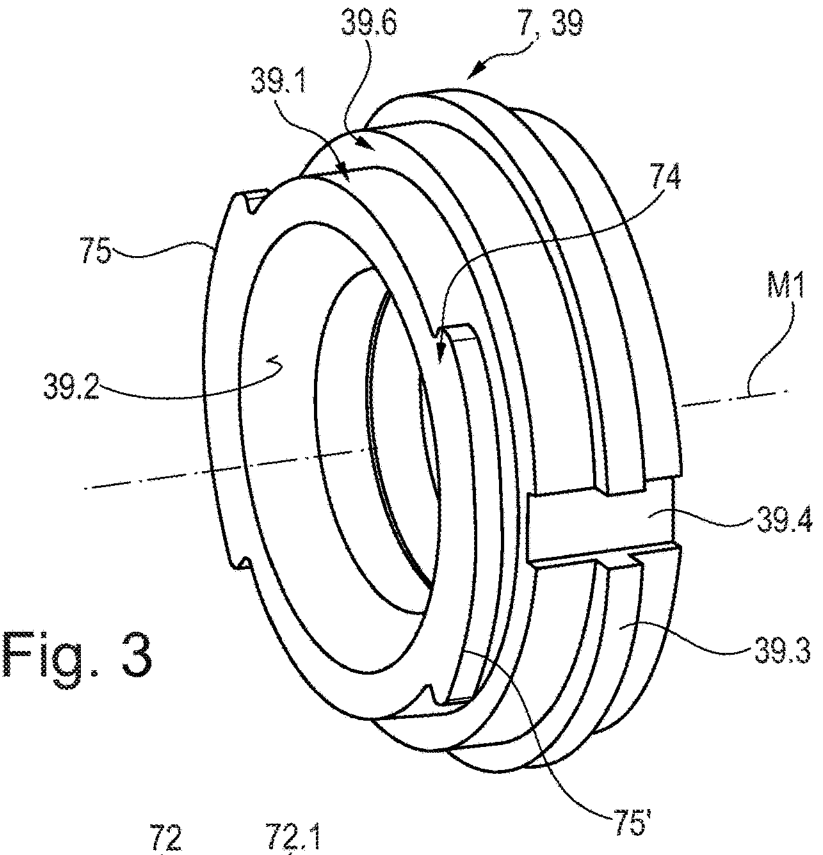
FIG. 3 shows the retaining structure of the exemplary riveting device of FIG. 1 in a perspective representation.

The other exemplary riveting device 1' differs from the exemplary riveting device 1 of FIGS. 1 and 2 in that a device housing 5' receiving the drive device 30 is provided which is used for the bayonet lock 70. In the further exemplary riveting device 1', the above-described bayonet connection 74 is assigned to the device housing 5', for example the tube-shaped contour 5.2 of the device housing 5', in particular arranged thereon, for example moulded thereon.

In the further exemplary riveting device 1', a support structure 39', for example, is provided which can correspond to the support structure 39 of the exemplary riveting device 1, for example without the ring segments 75, 75' of the bayonet connection 74, however.

In contrast, in the further exemplary riveting device 1', the device housing 5' has a ring-shaped extension 5.1', on the outer circumference of which the at least two radially outwardly protruding ring segments 75, 75' of the bayonet connection 74 are arranged or formed. The device housing 5' can otherwise be structurally identical to the device housing 5 of the exemplary riveting device 1 of FIGS. 1 and 2.

Figure 8:
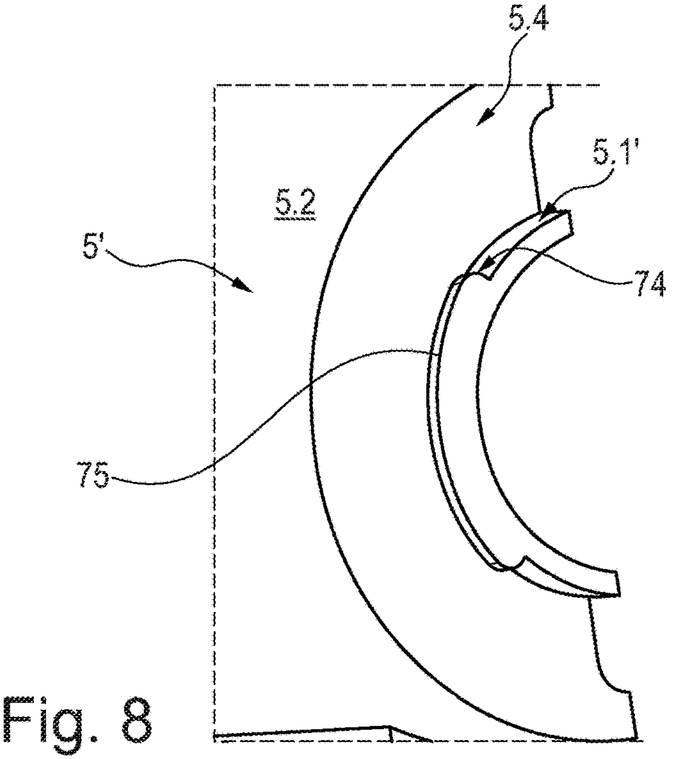
FIG. 8 shows a section of a device housing of the exemplary riveting device of FIG. 7 in a view of a bayonet connection.

FIG. 8 shows an example of the device housing 5' in the region of the ring-shaped extension 5.1'. For example, the ring-shaped extension 5.1' is formed on the device housing 5', in particular moulded thereon. For example, the ring-shaped extension 5.1' is located on the one end face 5.4 of the tube-shaped contour 5.2 of the device housing 5'. For example, the inner circumference of the tube-shaped extension 5.1' surrounds the support structure 39' with radial clearance (FIG. 7).

Figure 9:
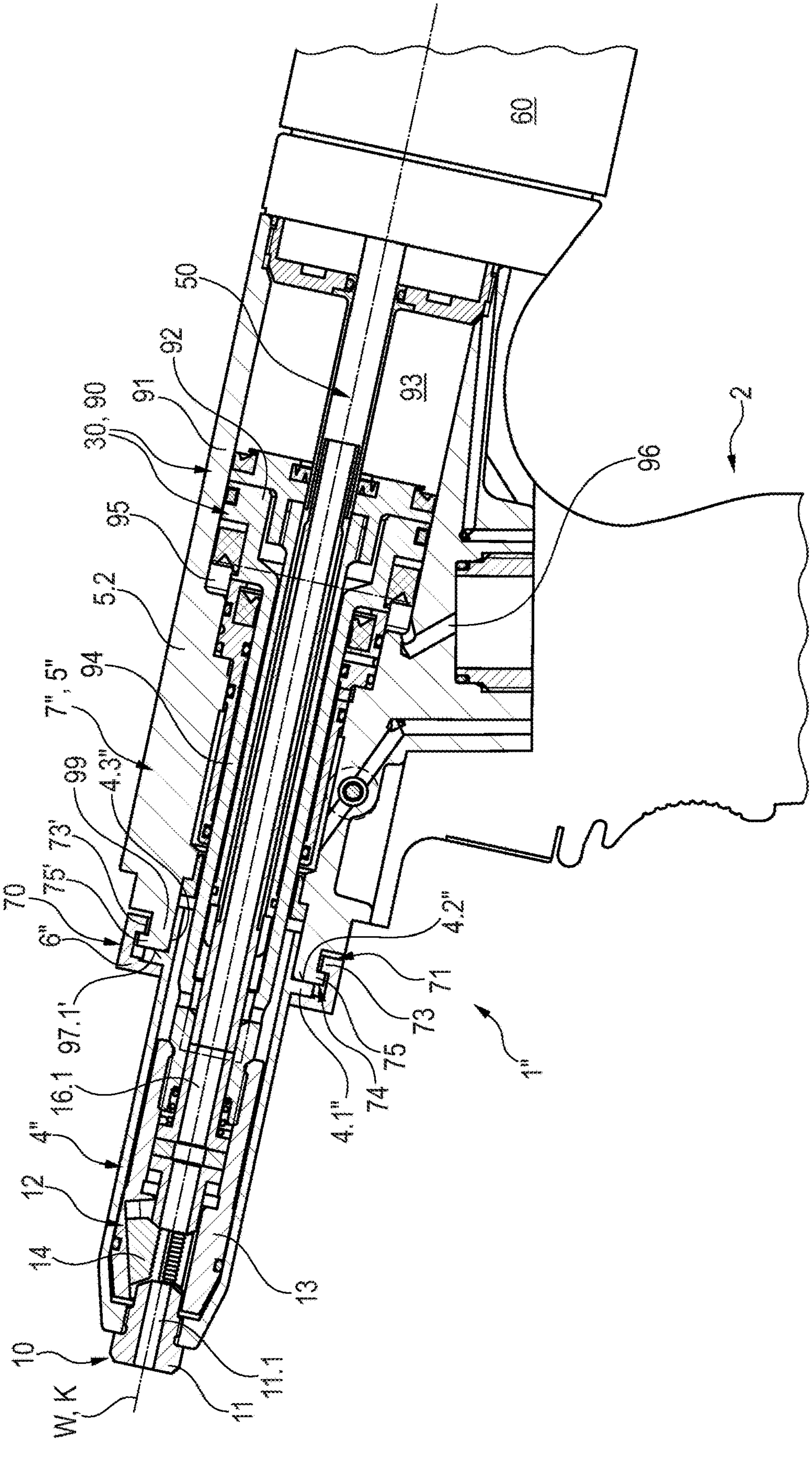
FIG. 9 shows a third exemplary embodiment of a riveting device having a riveting tool and a drive device for actuating the riveting tool in a schematic sectional representation.

FIG. 9 shows by way of example another embodiment of a riveting device 1". FIG. 9 shows the further exemplary riveting device 1" by way of example in a simplified representation as a partial section. Components of the further exemplary riveting device 1' which are structurally or functionally identical to components of the exemplary riveting device 1 of FIGS. 1 and 2 are provided with the same reference numerals; in this respect, reference is made to the description of the exemplary riveting device 1 of FIGS. 1 and 2.

The other exemplary riveting device 1" differs from the exemplary riveting device 1 of FIG. 1 inter alia in that the drive device 30 comprises a cylinder piston unit 90, which serves to actuate the riveting tool 10. Preferably, the cylinder piston unit 90 has a cylinder 91 and a reciprocating piston 92. For example, the cylinder 91 forms a device housing 5" receiving the drive device 30 or is a component thereof.

Preferably, the cylinder 91 has a piston space 93 in which the reciprocating piston 92 is received translationally moveably. Preferably, the reciprocating piston 92 is operatively connected to the mandrel holder 12. For this purpose, a piston extension 94 can be arranged on the reciprocating piston 92, in particular moulded thereon, which is connected, in particular screwed to the mandrel holder 12, in particular the chuck housing 13, on an end or end region facing towards the riveting tool 10. For example, the piston extension 94 is tube-shaped. For example, the piston axis K of the reciprocating piston 92 is on the operative axis W. For example, the reciprocating piston 92 is set up to be moved along the operative axis W.

The drive device 30 can be pneumatically and/or hydraulically driven by the cylinder piston unit 90. For example, at least one supply channel 96 is provided. For example, the supply channel 96 leads into a fluid chamber 95, via which a medium pressure can be exerted onto the reciprocating piston 92. The further exemplary riveting device 1" may be a pneumatically-driven riveting device, for example. Such a pneumatically-driven riveting device is known and is described in more detail in the publication EP 1 132 160 A1, to which reference is hereby made for the purpose of completing and supplementing the present disclosure, with the note that the publication may attach a meaning to identically worded terms which differs from the present meaning.

With the further exemplary riveting device 1", the mandrel holder 12 is received axially moveably in a tool housing 4" which on the one hand is axially supported on the mouthpiece 11 and on the other hand is axially supported on the cylinder 91 via a flange 4.1". For example, the flange 4.1" has a flange surface 4.2" which corresponds to a mating flange surface 97.1' which is assigned to the cylinder 91. For example, the mating flange surface 97.1 is formed on the cylinder 91. For example, the flange surface 4.2" of the tool housing 4" is arranged transverse, in particular orthogonal, to the operative axis W. For example, the flange surface 4.2" of the tool housing 4" is circumferential around the operative axis W.

With the further exemplary riveting device 1", a supporting structure 7" is provided, for example, which supports the tool housing 4". A connection between the tool housing 4" and the supporting structure 7" is realised in the present case by the tool housing 4" being plugged into a recess or a through hole of the device housing 5" and/or the cylinder 91 via a longitudinal section 4.3". In this respect, the longitudinal section 4.3" serves as a plug-in section. Preferably, the outer circumference of the plug-in section and the inner circumference of the recess or the through hole correspond accordingly, in particular with a clearance. Therefore, support transverse to the operative direction W is achieved.

For example, the longitudinal section 4.3" extends from a free end of the tool housing 10, which is opposite to the mouthpiece 11, up to the flange 4.1". The flange 4.1" is provided as a circumferential collar on the outer circumference of the tool housing 4" for example, in particular is arranged or moulded thereon. Thus, the plug-in depth into the device housing 5" or the cylinder 91 is delimited by the flange 4.1".

With the further exemplary riveting device 1", a retaining structure 6" is provided, for example, in order to prevent the tool housing 4" from falling out of the recess or the through hole of the device housing 5" of the cylinder 91. Preferably, the retaining structure 6" is a separate component. For example, the retaining structure 6" is formed according to the retaining structure 6 of the exemplary riveting device 1 according to FIG. 1. In this respect, reference is made to the above description of the retaining structure 6.

With the further exemplary riveting device 1", a fixing of the retaining structure 6" is also provided by way of example on the supporting structure 7" via a bayonet lock. The bayonet lock can be the bayonet lock 70 having the bayonet connections 71 and 74, such as is used with the riveting device 1 of FIG. 1. As a result, reference has been made to the above description, in particular of FIGS. 3 to 6.

With the further exemplary riveting device 1", the bayonet connection 71 is assigned to the retaining structure 6" for example, in particular arranged thereon, for example formed thereon. The further bayonet connection 74 is provided on the supporting structure 7", in particular the device housing 5" or the cylinder 91. For example, the further bayonet connection 74 is arranged on a ring-shaped extension 99 of the supporting structure 7", in particular formed thereon.

Figure 10:
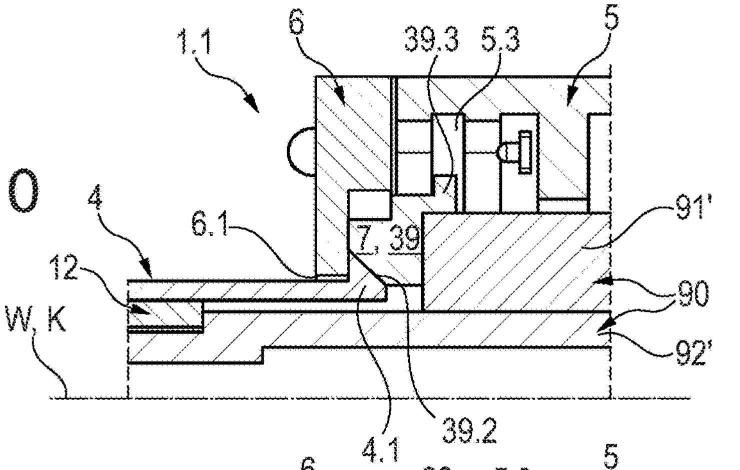
FIGS. 10 and 11 show in each case a modified embodiment of the exemplary riveting device of FIG. 1 in the region of the representation in FIG. 2 as a half section.

FIG. 10 shows a further embodiment of a riveting device 1.1 having an embodiment of the cylinder piston unit 90. The riveting device 1.1 may be a modification of the riveting device 1 of FIG. 1. The spindle gear 32 of the riveting device 1 of FIG. 1 is replaced in the case of the riveting device 1.1 by the cylinder piston unit 90. The cylinder piston unit 90 comprises a cylinder 91' and a reciprocating piston 92' received translationally moveably therein. The reciprocating piston 92' is operatively connected to the mandrel holder 12. The cylinder 91' is supported with an axial end against the support structure 39, which in this case serves as an axial support for the cylinder 91'. With the riveting device 1.1, as with the riveting device 1, the support structure 39 and the supporting structure 7 are formed on the same component.

Figure 11:
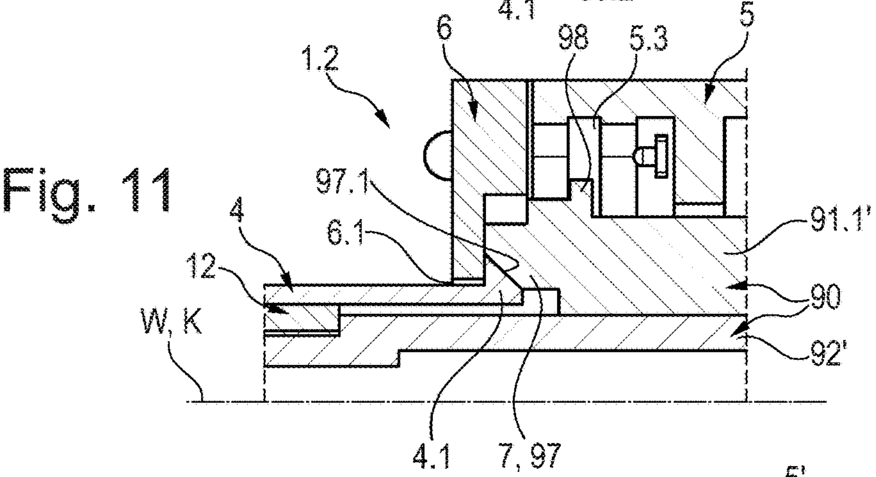

FIG. 11 shows a further embodiment of a riveting device 1.2 having an embodiment of the cylinder piston unit 90. The riveting device 1.2 is a modification of the riveting device 1.1, in which the supporting structure 7 is provided directly on a cylinder 91.1' of the cylinder piston unit 90, in particular formed or moulded thereon, and for example a separate support structure is omitted. For example, a mating flange 97 for the flange 4.1 of the tool housing 4 is formed on the cylinder 91.1'. For example, the mating flange 97 has a mating flange surface 97.1 which corresponds to the flange surface 4.2 of the flange 4.1 of the tool housing 4. For example, in this case, a collar 98 of the cylinder 91.1' takes over the function of the circumferential collar 39.3 of the support structure 39, which is described above for the riveting device 1.1 of FIG. 10 or for the riveting device 1 of FIG. 1.

Figure 12:
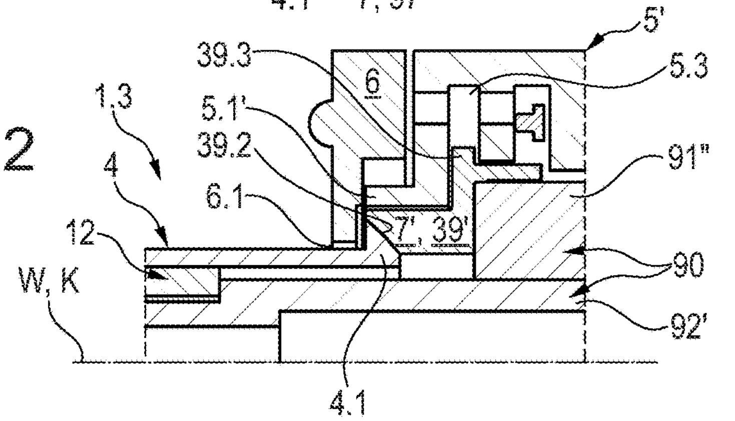
FIGS. 12 and 13 show in each case a modified embodiment of the exemplary riveting device of FIG. 7 in the region of the representation in FIG. 7 as a half section.

FIG. 12 shows a further embodiment of a riveting device 1.3 having an embodiment of the cylinder piston unit 90. The riveting device 1.3 may be a modification of the riveting device 1' of FIG. 7. The spindle gear 32 of the riveting device 1' of FIG. 7 is replaced in the case of the riveting device 1.3 by the cylinder piston unit 90. The cylinder piston unit 90 comprises a cylinder 91" and a reciprocating piston received translationally moveably therein, which can be formed according to the reciprocating piston 92' of the riveting device 1.1. The reciprocating piston 92' is operatively connected to the mandrel holder 12. The cylinder 91" is supported with an axial end against the support structure 39', which in this case serves as an axial support for the cylinder 91". With the riveting device 1.3, as with the riveting device 1', the support structure 39' does not form any bayonet connection. The bayonet connection 74 is arranged on the device housing 5', in particular formed thereon.

Figure 13:
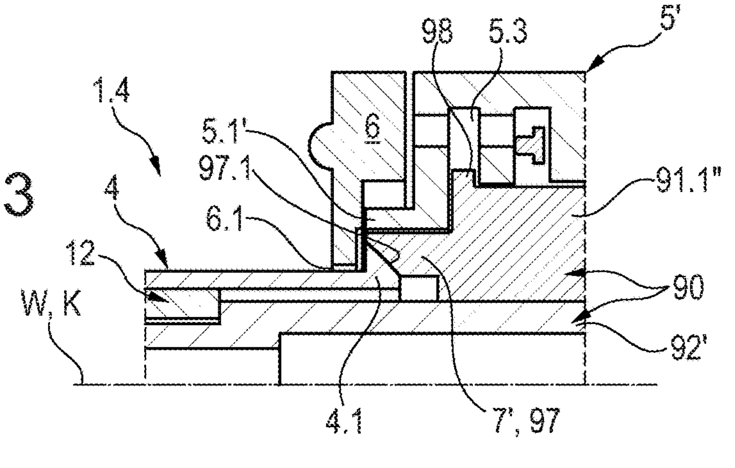

FIG. 13 shows a further embodiment of a riveting device 1.4 having an embodiment of the cylinder piston unit 90. The riveting device 1.4 is a modification of the riveting device 1.3, in which the supporting structure 7' is provided directly on a cylinder 91.1" of the cylinder piston unit 90, in particular formed or moulded thereon, and for example a separate support structure is omitted.

Figure 14:
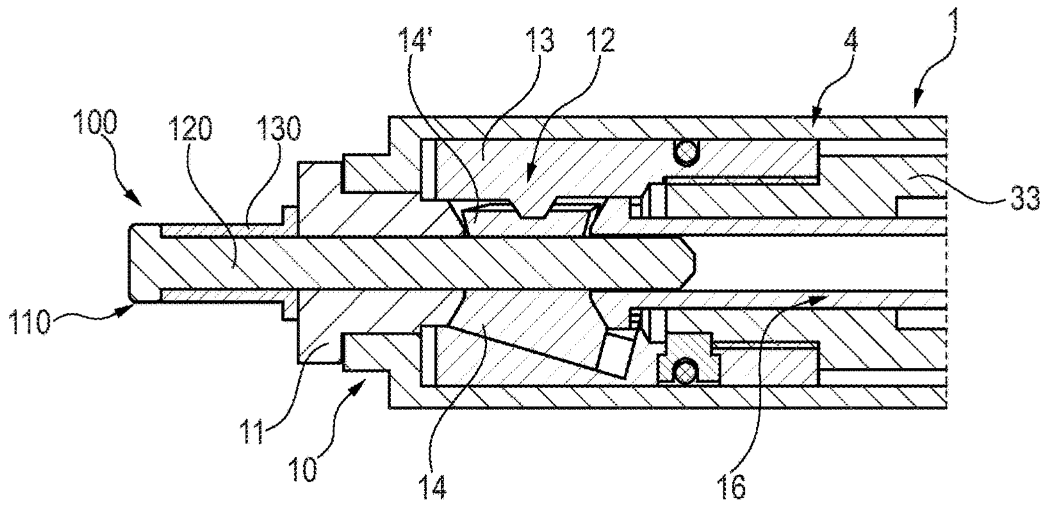
FIG. 14 shows a possible embodiment of a blind rivet setting tool having the exemplary riveting device of FIG. 1 in a schematic partial representation.

FIG. 14 shows an example of a possible embodiment of a blind rivet setting tool 100. The blind rivet setting tool 100 has the construction of the above-described exemplary riveting device 1, wherein only a section of the exemplary riveting device 1 is shown in the region of the riveting tool 10 in FIG. 14 for simplicity. In the blind rivet setting tool 100, a rivet mandrel 120 of a blind rivet 110 is introduced into the mouthpiece 11 and received in the mandrel holder 12, in particular the chuck housing 13, and fixed in the axial direction, for example by the at least one clamping element 14 or 14'. FIG. 14 shows the blind rivet 110 in the state before riveting, in which the rivet body 130 of the blind rivet 110 is still in its initial state.

Figure 15:
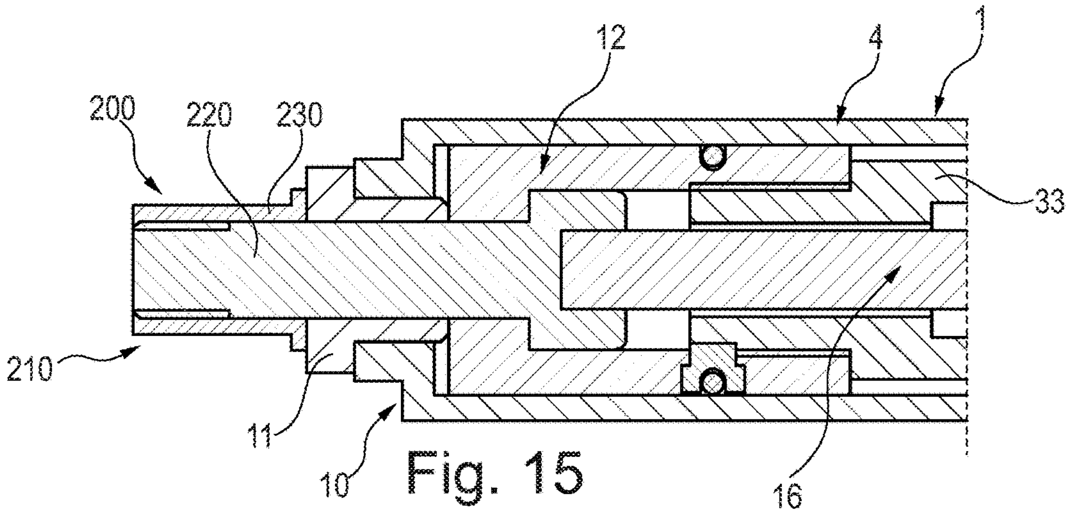
FIG. 15 shows a possible embodiment of a blind rivet nut setting tool having the exemplary riveting device of FIG. 1 in a schematic partial representation.

FIG. 15 shows an example of a possible embodiment of a blind rivet nut setting tool 200. The blind rivet nut setting tool 200 has the construction of the above-described riveting device 1, wherein the mandrel holder 12 and the pressure part 16 are modified in respect to a rivet mandrel for a blind rivet nut and the rivet mandrel is a threaded rivet mandrel. For example, the pressure part 16 has a function in respect to a spindle of the threaded rivet mandrel into the blind rivet nut. In FIG. 15, only a section of the riveting device 1 is shown in the region of the riveting tool 10 for simplicity. With the blind rivet nut setting tool 200, a threaded rivet mandrel 220 for a blind rivet nut 210 is received in the mandrel holder 12. FIG. 10 shows the blind rivet nut 210 in the state before riveting, in which the rivet body 230 of the blind rivet nut 210 is still in its initial state.

For example, with the exemplary blind rivet nut setting tool 200, the pressure part 16 is introduced into a receptacle of the threaded rivet mandrel 220 and forms a form-fitting rotationally-fixed connection to the threaded rivet mandrel 220 via the receptacle. For example, the pressure part 16 is held in the receptacle of the threaded rivet mandrel 220 by the force of the spring element 15 of the riveting device 1 (FIG. 1), which acts axially on the pressure part 16.

Figure 16:
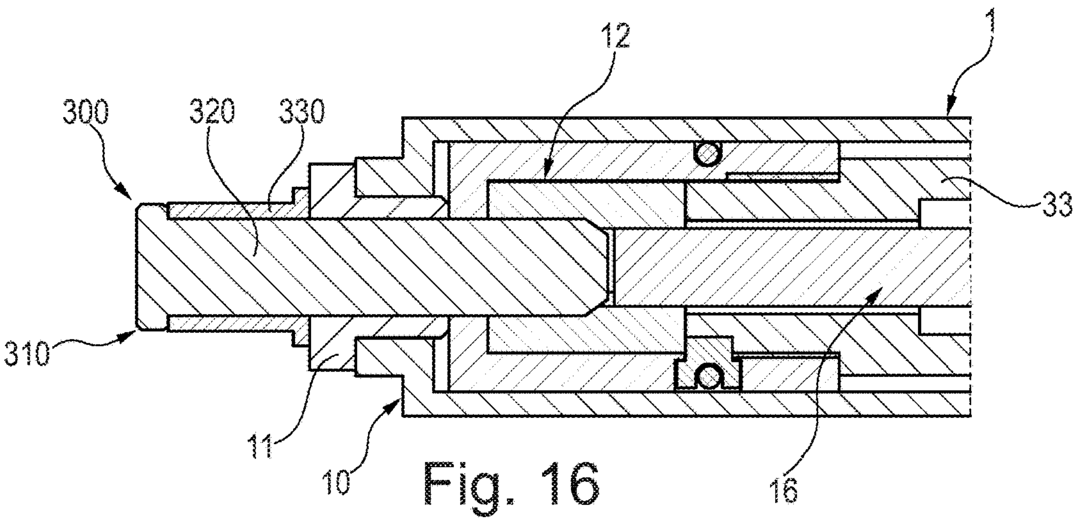
FIG. 16 shows a possible embodiment of a blind rivet screw setting tool having the exemplary riveting device of FIG. 1 in a schematic partial representation.

FIG. 16 shows an example of a possible embodiment of a blind rivet screw setting tool 300. The blind rivet screw setting tool 300 has the construction of the above-described riveting device 1, wherein the mandrel holder 12 and the pressure part 16 is modified in respect of a rivet mandrel of a blind rivet screw and the rivet mandrel is a threaded rivet mandrel. For example, the pressure part 16 has a function there with regard to threading the threaded rivet mandrel into a screw-in part of the mandrel holder 12. In FIG. 16, only a section of the riveting device 1 is shown in the region of the riveting tool 10 for simplicity. With the blind rivet screw setting tool 300, a threaded rivet mandrel 320 of a blind rivet screw 310 is received in the mandrel holder 12. FIG. 16 shows the blind rivet screw 310 in the state before riveting, in which the rivet body 330 of the blind rivet screw 310 is still in its initial state.

For example, with the exemplary blind rivet screw setting tool 300, the pressure part 16 acts on the screw-in part, in particular the pressure part 16 is introduced into a receptacle of the screw-in part and forms a form-fitting rotationally-fixed connection to the screw-in part via the receptacle. For example, the pressure part 16 is held in the receptacle of the screw-in part by the force of the spring element 15 of the riveting device 1 (FIG. 1), which acts axially on the pressure part 16.

Fundamentally, the blind rivet setting tool 100 and/or the blind rivet nut setting tool 200 and/or the blind rivet screw setting tool 300 can also have the construction of the riveting device 1' or the riveting device 1" or the riveting device 1.1 or the riveting device 1.2 or the riveting device 1.3 or the riveting device 1.4.

REFERENCE NUMERAL LIST

1, 1', 1" riveting device
1.1, 1.2 riveting device
1.3, 1.4 riveting device
2 handle part
2.1 gripping surface
3 accumulator
4, 4" tool housing
4.1, 4.1" flange
4.2, 4.2'" flange surface
4.3" longitudinal section
5, 5', 5" device housing
5.1' extension
5.2 tube-shaped contour
5.3 receptacle
5.4 end face
6, 6" retaining structure
6.1 through-opening
6.2 wall surface
6.3 recess
7, 7', 7" supporting structure
10 riveting tool
11 mouthpiece
11.1 through hole
12 mandrel holder
13 chuck housing
14, 14' clamping element
15 spring element
16 pressure part
16.1 through hole
30 drive device
31 electric motor
31.1 output shaft
32 spindle gear
33 threaded spindle
33.1 front end
33.2 back end
34 spindle nut
35, 35' radial bearing
36 axial bearing
37, 37' reduction stage
38 intermediate shaft
39, 39' support structure
39.1 extension
39.2 flange surface
39.3 collar
39.4 groove
39.5 recess
39.6 shoulder
40 through hole
41 torque arm
43 counter bearing
50 tubular element
60 collection container
70 bayonet lock
71 bayonet connection
72 plug-in receptacle
72.1 circumferential surface
72.2 base surface
73, 73' ring segment
74 bayonet connection
75, 75' ring segment
80, 80' light source
81, 81' light guide
90 cylinder piston unit
91 cylinder
91', 91.1' cylinder
91", 91.1" cylinder
92, 92' reciprocating piston
93 piston space
94 piston extension
95 fluid chamber
96 supply channel
97 mating flange
97.1 mating flange surface
98 collar
99 extension
100 blind rivet setting tool
110 blind rivet
120 rivet mandrel
130 rivet body
200 blind rivet nut setting tool
210 blind rivet nut
220 threaded rivet mandrel
230 rivet body
300 blind rivet screw setting tool
310 blind rivet screw
320 threaded rivet mandrel
330 rivet body
K piston axis
M1, M2 central axis
S spindle axis
W operative axis

The invention claimed is:

1. A riveting device, comprising:
a device housing;
a riveting tool having
a mouthpiece and
a mandrel holder,
wherein the mandrel holder can be moved relative to the mouthpiece along an operative axis;
a drive device in the device housing for actuating the riveting tool, having
a spindle gear which has
a threaded spindle and
a spindle nut operatively connected thereto,
wherein the threaded spindle is operatively connected to the mandrel holder and is set up to be moved along the operative axis;
a support structure for axial support of the spindle nut;

a tool housing,
wherein the tool housing is axially supported on the mouthpiece,
wherein the tool housing is axially supported on the support structure via a flange thereof, and
wherein the mandrel holder is received axially moveably in the tool housing;
a supporting structure for supporting the tool housing; and
a retaining structure via which the tool housing is held on the supporting structure,
wherein the retaining structure and the tool housing are separate components, and
wherein the retaining structure and the supporting structure are connected to each other via a bayonet lock.

2. The riveting device according to claim 1,
wherein the bayonet lock comprises a bayonet connection coupled to the retaining structure,
wherein the retaining structure comprises a through-opening in a wall surface thereof,
wherein the tool housing is received in the through-opening,
wherein the wall surface is provided in a region around the through-opening as an axial limitation for the flange of the tool housing, and
wherein the bayonet lock is provided at a radial distance from the through-opening.

3. The riveting device according to claim 2,
wherein the bayonet connection has a ring structure, an inner circumference of which surrounds the through-opening and the tool housing at a radial distance.

4. The riveting device according to claim 2,
wherein the bayonet connection comprises a plug-in receptacle,
wherein the plug-in receptacle has a circumferential surface,
wherein the circumferential surface is circumferential at a radial distance around the through-opening,
wherein at least two radially inwardly protruding ring segments are provided on the circumferential surface, and
wherein the at least two radially inwardly protruding ring segments are arranged distributed over the circumference of the plug-in receptacle and serve to lock the bayonet lock.

5. The riveting device according to claim 4,
wherein the plug-in receptacle is formed in the retaining structure by a ring-shaped recess.

6. The riveting device according to claim 1,
wherein the bayonet lock comprises a bayonet connection coupled to the supporting structure,
wherein the supporting structure has a ring-shaped extension,
wherein at least two radially outwardly protruding ring segments are provided on an outer circumference of the ring-shaped extension, and
wherein the at least two radially outwardly protruding ring segments are arranged distributed over the outer circumference and serve to lock the bayonet lock.

7. The riveting device according to claim 6,
wherein the supporting structure is arranged on the support structure or is formed by the support structure and
wherein a flange surface cooperating with the flange of the tool housing is formed on an inner circumference of the ring-shaped extension.

8. The riveting device according to claim 1,
wherein the bayonet lock comprises a bayonet connection assigned to the device housing,
wherein the device housing has a ring-shaped extension,
wherein at least two radially outwardly protruding ring segments are provided on an outer circumference of the ring-shaped extension, and
wherein the at least two radially outwardly protruding ring segments are arranged distributed over the outer circumference and serve to lock the bayonet lock.

9. The riveting device according to claim 8,
wherein an inner circumference of the ring-shaped extension surrounds the supporting structure, the support structure, the tool housing, and/or the flange at a radial distance or at least with radial clearance.

10. The riveting device according to claim 8,
wherein a flange surface cooperating with the flange of the tool housing is formed on an end face of the ring-shaped extension.

11. The riveting device according to claim 1,
wherein the device housing has an at least partially tube-shaped contour,
wherein the at least partially tube-shaped contour extends with a tube axis coaxial to the operative axis, and
wherein the retaining structure is arranged on an end face of the tube-shaped contour facing towards the mouthpiece.

12. The riveting device according to claim 11,
wherein the retaining structure is circumferential around an outer circumference of the tool housing in relation to the operative axis and covers the end face of the tube-shaped contour and/or closes an interior space of the tube-shaped contour at the end face.

13. The riveting device according to claim 1, further comprising
at least one light source in the device housing,
wherein the retaining structure is formed at least in one region as a light guide or has one light guide in order to transmit light rays of the light source towards the mouthpiece, and
wherein the light guide is connected downstream of the bayonet lock and/or the support structure when viewed radially outwards.

14. The riveting device according to claim 1,
wherein the support structure is ring-shaped and has a circumferential collar on its outer circumference, and
wherein the circumferential collar engages into a receptacle of the device housing with axial and/or radial clearance.

15. The riveting device according to claim 1,
wherein the support structure is circular and has a groove or elongate recess on a circumference thereof,
wherein a longitudinal extension of the groove or elongate recess extends along the operative axis, and
wherein a material section of the device housing engages into the groove or elongate recess in order to secure against rotation.

16. The riveting device according to claim 1,
wherein the riveting device is a hand riveting device and comprises a handle part, and
wherein the handle part is formed or fixed on the device housing.

17. A blind rivet setting tool, comprising:
the riveting device according to claim 1, and
a rivet mandrel of a blind rivet to be set,
wherein the rivet mandrel is received in the mandrel holder of the riveting device.

18. A blind rivet nut setting tool, comprising:
the riveting device according to claim 1, and
a threaded rivet mandrel for a blind rivet nut to be set, wherein the threaded rivet mandrel is received in the mandrel holder of the riveting device.

19. A blind rivet screw setting tool, comprising:

the riveting device according to claim 1, and a threaded rivet mandrel of a blind rivet screw to be set, wherein the threaded rivet mandrel is received in the mandrel holder of the riveting device.

20. A riveting device, comprising:

a device housing;

a riveting tool having a mouthpiece and a mandrel holder wherein the mandrel holder can be moved relative to the mouthpiece along an operative axis;

a drive device in the device housing for actuating the riveting tool, having a cylinder piston unit including a cylinder and a reciprocating piston received moveably therein, wherein the reciprocating piston is operatively connected to the mandrel holder and is set up to be moved along the operative axis;

an optional support structure for axial support of the cylinder;

a tool housing, wherein the tool housing is axially supported on the mouthpiece, wherein the tool housing is axially supported on the optional support structure and/or the cylinder via a flange thereof, and wherein the mandrel holder is received axially moveably in the tool housing;

a supporting structure for supporting the tool housing; and a retaining structure via which the tool housing is held on the supporting structure, wherein the retaining structure and the tool housing are separate components, and wherein the retaining structure and the supporting structure are connected to each other via a bayonet lock.

21. The riveting device according to claim 20, wherein the bayonet lock comprises a bayonet connection coupled to the retaining structure, wherein the retaining structure comprises a through-opening in a wall surface thereof, wherein the tool housing is received in the through-opening, wherein the wall surface is provided in a region around the through-opening as an axial limitation for the flange of the tool housing, and wherein the bayonet lock is provided at a radial distance from the through-opening.

22. The riveting device according to claim 20, wherein the bayonet lock comprises a bayonet connection assigned to the device housing, wherein the device housing has a ring-shaped extension, wherein at least two radially outwardly protruding ring segments are provided on an outer circumference of the ring-shaped extension, and wherein the at least two radially outwardly protruding ring segments are arranged distributed over the outer circumference and serve to lock the bayonet lock.

23. The riveting device according to claim 22, wherein a flange surface cooperating with the flange of the tool housing is formed on an end face of the ring-shaped extension.

24. The riveting device according to claim 20, wherein the device housing has an at least partially tube-shaped contour, wherein the at least partially tube-shaped contour extends with a tube axis coaxial to the operative axis, and wherein the retaining structure is arranged on an end face of the tube-shaped contour facing towards the mouthpiece.

* * * * *